Dec. 11, 1945.   E. W. SHAW   2,390,668
AIRCRAFT STRUCTURE
Filed Feb. 4, 1943

INVENTOR:
E. W. SHAW;
BY Robert C. Rasche,
ATTORNEY.

Patented Dec. 11, 1945

2,390,668

UNITED STATES PATENT OFFICE 2,390,668

AIRCRAFT STRUCTURE

Edward W. Shaw, Babylon, N. Y., assignor to Republic Aviation Corporation, Farmingdale, N. Y., a corporation of Delaware Application February 4, 1943, Serial No. 474,645

12 Claims. (Cl. 244—102)

This invention deals with aircraft landing gear and is particularly concerned with the landing-gear components that are located in the tail of the airplane.

In ultra-high speed airplanes, such as pursuit interceptors, projections from the essential aerodynamic configuration of the airplane detract materially from the requisite performance of the airplane, as by augmenting the drag without providing any lift at all. For this reason, it is essential to retract all non-lifting components during flight and this prerequisite is of especial significance with respect to the usually rather bulky landing-gear components, including the tail wheel group.

Although it is a relatively simple matter to provide satisfactory retracting means per se for the tail wheel group, it is quite a different matter to maintain this group secured in its retracted position despite the manifold adverse influences tending to dislodge this wheel from its retracted position and allow it to protrude and dangle from the airplane during flight, with consequent detrimental results to the required performance of the airplane.

The present invention aims to provide a mechanical system embodied in the tail wheel group which, though enabling full retraction into the airplane fuselage of the tail wheel, yoke, post, knuckle, steering and swivel means and shock absorber, will, nonetheless, definitively preclude any component of the tail wheel group from becoming disengaged and protruding, or dangling, from the fuselage into the airstream when such protrusion is not desired, and will, in the event of unpremeditated or accidental release of the tail wheel group tending to protract it, positively seize and immobilize the tail wheel group in its retracted position until positive means are deliberately actuated by the pilot to protract the tail wheel.

A definitive object of the invention is to provide, for retractable tail wheel constructions, means for positively inter-engaging with, and holding, the entire tail wheel assembly retracted up into the fuselage, together with means for positively and directly locking the inter-engaging means in their inter-engaged position, in such a manner that the possibility of any movable part of the tail wheel group's coming loose from these means and dangling in the airstream will be rendered somewhat more than remote.

A specific object of the invention is to provide, in the tail wheel up-lock mechanism, a tail wheel securing-mechanism which will automatically engage the tail wheel group in retraction and will automatically lock the engaging parts in engaging position, but which can be facilely operated on occasion, to quickly unlock and release the tail wheel for protraction, without, as is usual, having to lift any part of the heavy tail-wheel group to release same.

A further specific object of the invention is to provide, in an up-lock of this improved nature, automatic means for positively and immediately returning all the movable effective parts of the up-lock mechanism to normal position, ready for engaging the retracting tail wheel structure, the instant the control member for the up-lock is moved out of its "down" position.

Still another specific object of the invention is to provide complementary means on the aircraft and on the landing gear for direct inter-engagement to hold the tail wheel group in its retracted position, together with special means for positively maintaining these means in inter-engagement, but not locked, chiefly by the very gravitational force which tends to separate same.

A noteworthy feature of the invention is the provision of a security measure of this kind which can be actuated and controlled from the pilot's cockpit by the same single handle or control lever that actuates the retraction and protraction of the entire landing gear system, including the main wheels, to thereby provide the improvements contemplated by this invention without adding another lever to the already overly-numerous levers in the cockpit of the present day airplane.

The other objects, as well as the accomplishments, and the other features of novelty, of the invention will either manifest themselves or be made apparent as this disclosure progresses.

A presently-preferred embodiment of these and other inventive concepts and objects is illustrated in the accompanying drawing, but by way of exemplification only, since it is to be understood that the invention is limited in the embodiments which it can take, only by the scope of the subjoined claims.

In the drawing

Figure 1:
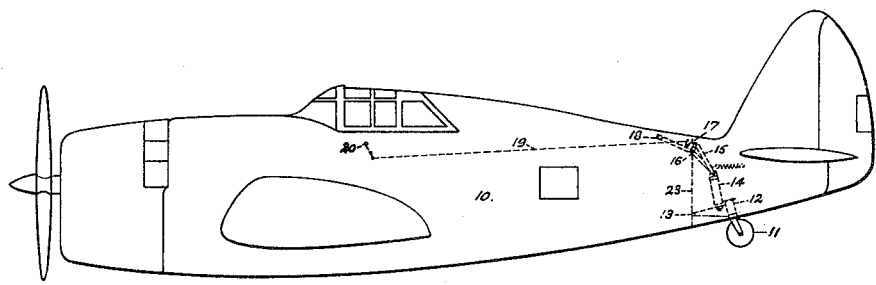
Figure 1 is a side elevation of an ultra-high speed airplane, showing the retractable tail wheel system incorporating the present invention.

The general organization shown in Figure 1 comprises an airplane provided with retractable main landing wheels, 50, and a retractably-mounted tail wheel 11, of the type which can be steered for taxying; self-locked in protracted position for take-off and landing, and self-unlocked, for swivelling under excessive side-thrusts; and such wheel group is also provided with the improvements more particularly the concern of the present invention.

The wheel 11 itself is carried by a tail wheel post-and-cantilever wheel-yoke, 12, the yoke being pivotally mounted, as at 13, on a structural member of the fuselage. A shock-absorber, 14, preferably of the oleo-pneumatic type, is provided for the wheel and is pivotally attached, at one end, to the yoke 12, and, at the other, to a V-brace group 15. An hydraulic-motor group, 18, is provided for retracting the tail wheel and is suitably pivotally mounted, at one end, on a structural member of the fuselage and is suitably pivotally attached, at the other end, to the V-brace group, all as shown in Figure 1.

The V-brace 15 carries, on one arm thereof, a roller-group 16, forming part of an up-lock structure (Figure 2) which also includes a hook-group, 17, by means of which the entire retractable tail-wheel assembly can be held, on occasion, retracted out of the airstream, into the fuselage. Said up-lock group is adapted to be actuated and controlled, from the cockpit, by means including a tensile connector 19, and a control handle 20, the same handle actuating and controlling the retraction and protraction of the entire landing-gear system of the airplane.

Figure 2:
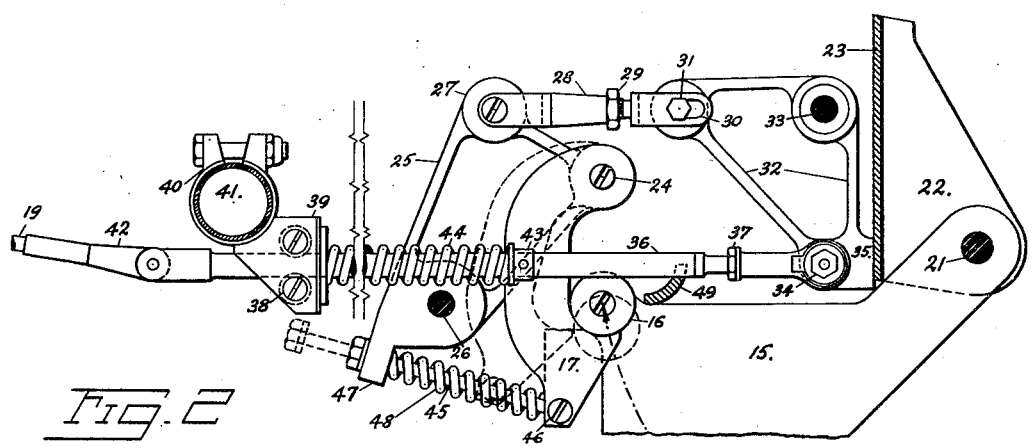
Figure 2 is an enlarged detailed view of a major group of the present improvements, showing the parts thereof occupying the retraction position.
Figure 3:
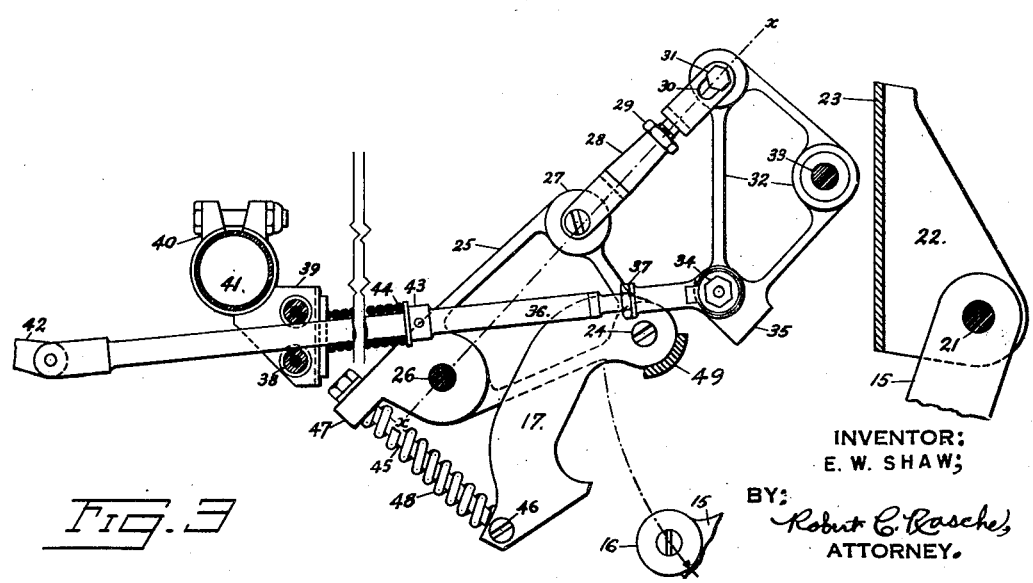
Figure 3 is a view similar to Figure 2, showing the parts occupying the protraction position.

Referring more particularly to the details of the "up-lock" mechanism itself, and especially to Figures 2 and 3, the V-brace 15 (which carries the roller 16 at one end, and is pivoted at its other end to the shock-absorber strut 14), is swivelled, as at 21, to brackets 22 mounted on the bulkhead 23 of the fuselage. The hook 17 is pivotally mounted on a floating pivot 24, which pivot is itself adapted to move in a curvilinear path about the fixed pivot 26. The pivot-point 24 forms one of the apices of a triangular lever-group 25, which group is bodily pivoted to the framework of the fuselage at another apex, as at 26. On the third apex, 27, of the triangle, is pivotally attached an adjustable-length member 28 having an adjustor 29 and having the other end bifurcated and bearing a slot 30.

Pivotally mounted at 33 on the framework of the fuselage, is another triangular lever, 32. A bolt 31, secured to one of the apices of this triangular lever 32, is adapted to ride in the slot 30. The third vertex of the triangular lever 32 carries a bolt 34, to which is pivotally attached a rod 36. This third apex also carries a shoulder or abutment 35, adapted to abut against the bulkhead 23, in the retracted position of the tail wheel, thereby acting as a stop to limit the rightward motion of rod 36.

Rod 36 controls the release of roller 16 to permit protraction of the wheel and is provided with an adjustment-group indicated at 37, which permits adjustments in the length of rod 36. At the other end, the rod 36 is entrained between a pair of rollers 38, carried by a guide-block 39 which is secured to a rigid, immobile, transverse tube 41, by means of a clamp, 40. The control cable 19 is anchored to the proximal end of the rod 36, as by means of a thimble, 42.

Intermediate the ends of rod 36, there is a collar 43 which is adjustable as to position. A free, helically-coiled spring 44 is mounted around rod 36 between collar 43 and guide 39, whereby to maintain operating cable 19 continuously under tension and also to maintain the shoulder or stop 35 pressed abutting against the bulkhead, in the retracted position of the tail-wheel, as shown in Figure 2.

Intermediate the lever 25 and one end of the hook 17, there is provided a rod 45, pivoted at 46 to the free end of the hook and having its other end passing through an aperture in a projection 47 of the lever. A free spring is coiled helically around this rod and thrusts against projection 47, and yields to permit the hook 17 to be urged out of the path of the roller 16 during the final stages of the retracting movement of the tail wheel, and to supplement the toggle action that locks the hook 17 in retraction, all as shown in dotted lines in Figure 2.

A fixed stop 49 is provided in the path of the movable pivot 24 and limits the extent of clockwise rotation of the lever 25 about pivot 26.

In taking-off for flight, when the pilot moves handle 20 from the "landing-gear down" position, to the "up" position—to effectuate the retraction of the main wheels 50 and of the tail wheel 11—the hydraulic cylinder 18 is also actuated thereby and pivots yoke 12 counterclockwise about its pivot axis 13, whereas the V-brace 15 pivots clockwise about its pivot axis 21. Near the end of the movement of member 15, roller 16 engages the slanted face of hook 17, then positioned in its path, and urges it laterally aside against the resistance of spring 48, all as shown in dotted lines in Figure 2. Howbeit, when the clockwise movement of the V-brace 15 is halted by stop 49, the spring-urged hook-group 17 is released from the left face of roller 16, and snaps back into the engaging position under roller 16, shown in full lines in Figure 2, whereby the tail-wheel assembly is now positively engaged in retracted position. In this state of affairs, forked member 28 and the upper branch of lever 32—then aligned in a right-line and maintained so by springs 44 and 48 and the contact between abutment 35 and bulkhead 23—conjointly act as a toggle for now immobilizing and locking the movable, floating pivot 24 in the position of Figure 2. In addition, the effect of the entire downwardly-tending weight of the wheel-group acting on roller 16, plus the effect of the spring 48 acting on the free end of the hook 17, maintain the hook and roller positively in engagement at the precise point where the toggle has positioned them. Thus, the tail-wheel group is now not only positively and directly engaged and hooked by member 17, but, in addition, the inter-engaging means, 17, 16, etc., themselves are positively locked, so that there will be very little likelihood that the wheel-group will come loose and dangle in flight.

In coming in for a landing, when the pilot moves handle 20 from the "landing-gear" position to the "down" position, the main wheels 50 and the tail-wheel 11 are simultaneously lowered by their hydraulic actuators; but, before the pressure-fluid actually reaches the operating-side of cylinder 18, V-brace 15 is automatically released by the mere operation of the handle 20, as shown in Figure 3. For, the tensile force exerted on rod 36 from cable 19 and handle 20, immediately collapses, or "breaks," aligned toggle 32, 28—Figure 2—and thereby abandons movable, or floating, pivot 24 to the gravitational effect of the entire weight of the tail-wheel assembly, acting on part 17 thru roller 16. By virtue of this action, lever 25 and hook 17 are pivoted clockwise as a unit until the hub of the movable pivot 24 meets stop 49, thereby releasing roller 16 and allowing the tail-wheel group to be protracted by cylinder 18.

In practice, the stop 49 is so positioned that the clockwise movement of lever 25 about pivot 26 is halted somewhat before the second toggle, 28, 25, becomes aligned and locked in its dead center position; that is to say, slightly before the three centers 26, 27 and 31 become aligned along line *x—x* of Figure 3. This feature of the invention provides for a positive, immediate, and automatic return of all the moving parts of the up-lock mechanism into their normal positions shown in Figure 2, whenever handle 20 is moved out of its "down" position, and leftward pull no longer acts on rod 36—the spring 44 being the instrumentality that applies power for re-collapsing of toggle 25, 28.

Notwithstanding the fact that the invention has been disclosed with reference to the details of a certain presently-preferred embodiment, it is to be understood that the inventive concepts art susceptible of embodiment with any of the refinements, perfections or modifications lying within the scope of the subjoined claims.

The invention having been thus disclosed, what is claimed as new and inventive, is:

1. In an aircraft having a fixed structure and a landing gear retractable within said structure, means for securing said landing gear in its retracted position, comprising a pivoted part of said securing means; a roller carried by said pivoted part; a shiftable pivot mounted on said fixed structure and movable to an upper and to a lower operative position; locking means to normally immobilize said pivot in its upper operative position; a hook freely mounted on said pivot and adapted to come into engagement with said roller when said pivot is in its upper position and when the landing gear reaches its retracted position; gravity-actuated locking means operated by the weight of the landing gear to normally lock said hook and roller in said engaged position; and releasing means, manually operable from the cockpit of said fixed structure, for releasing said first-mentioned locking means and thereby freeing said pivot to drop from said upper into its lower operative position under the weight of the landing gear and simultaneously adapting said hook to clear the path of said roller and thereby release said gravity-locking means without necessitating any lift at all of the roller.

2. In an aircraft having a fuselage and a tail wheel retractable within said fuselage, means for securing said tail wheel in its retracted position, comprising a pivoted part of the tail-wheel retracting group; a roller carried by said pivoted part; a shiftable pivot mounted in said fuselage; a locking toggle for normally holding said pivot in its active position; a spring-pressed hook mounted on said pivot and organized therewith to snap into engagement with said roller upon the tail wheel reaching retracted position; gravity-operated locking means acting concurrently with the spring of said hook to hold said hook and roller in engagement; and releasing means, manually operable from the cockpit of said fuselage, for breaking said toggle upon shift of said pivot to thereby swing the hook out of the path of the roller, whereby to release said gravity-locking means without necessitating lifting said roller.

3. In an aircraft: a retractable tail-wheel; means for retracting same; means on the aircraft and complementary means on the tail-wheel group for inter-engaging to hold said retracted tail-wheel group retracted; toggle-means for locking the said interengaged means in inter-engagement; tensile means for unlocking said toggle upon inception of protraction; means for protracting said tail-wheel group; and automatic means effective instantaneously upon the inception of retraction, for returning all said inter-engaging and locking members to position ready for engaging the retracting tail-group.

4. In an aircraft: a retractably mounted tail-wheel group; means for retracting same; means in the tail-wheel group adapted to be embraced; and means on the aircraft body for embracing same; said two latter means being mutually organized by retraction to place them in such relative positions that the embracement of the tail-group means by the body-mounted means is augmented by the very gravitational force that would otherwise tend to separate them.

5. In an aircraft the combination with a fuselage, of a tail wheel mounted structure thereon for protraction and retraction, means for protracting and retracting said tail wheel, a bodily movable lock assembly including a spring loaded latch carried by the fuselage, means operable between the fuselage and said lock assembly for moving the latter to a position where the latch may automatically engage a part of the tail wheel structure to hold it against protraction and to fix it in such position, and a control to release said lock assembly for the movement thereof to a position where the latch frees the tail wheel structure for protraction.

6. In an aircraft the combination with a fuselage, of a retractable landing gear, a first bell crank lever carrying a floating pivot and mounted for oscillation upon a pivot fixed to the fuselage, a latch pivoted on said floating pivot, a second bell crank lever mounted on a pivot fixed to the fuselage to normally abut a part of the fuselage, a link interposed between the two bell crank levers and combining with the second bell crank lever to constitute a toggle locking the latter in its abutting position and thereby locking the first bell crank lever against movement, and means whereby a part of the landing gear may cooperate with said latch upon the retraction of the landing gear.

7. In an aircraft the combination with a fuselage, of a retractable landing gear, a first bell crank lever carrying a floating pivot and mounted upon a pivot fixed to the fuselage, a latch pivoted on said floating pivot, a second bell crank lever mounted on a pivot fixed to the fuselage to normally abut a part of the fuselage, a link interposed between the two bell crank levers and combining with the second bell crank lever to constitute a toggle normally locking the latter in its normally abutting position and thereby lock the first bell crank lever against movement, and resilient means interposed between the first bell crank lever and said latch to normally position it in the path of movement of a part of the landing gear.

8. In an aircraft the combination with a fuselage, of a retractable landing gear, a supporting member mounted to swing upon a fixed pivot on the fuselage, a controlling member mounted to swing upon a second fixed pivot on the fuselage, a link interposed between and pivoted at its ends to said members to coordinate the movements thereof about their respective pivots, a spring loaded latch suspended from the supporting member to normally lie in the path of movement of a part of the landing gear upon the retraction thereof, and a control for the controlling member for moving it about its pivot whereby the link between it and the supporting member causes the latter to correspondingly swing about its pivot to move the latch to or from its normal position.

9. In an aircraft the combination with a fuselage, of a retractable landing gear, a pivoted supporting member, a pivoted controlling member, a link between said controlling member and said supporting member whereby said controlling member in one position locks the supporting member against movement about its pivot, a latch carried by the supporting member to lie in the path of movement of a part of the landing gear upon its retracting movement, and means for moving the controlling member to a second position and thereby swing the supporting member about its pivot to remove the latch from its position with respect to the path of movement of a part of the landing gear.

10. In an aircraft the combination with a fuselage including a retractable landing gear, of an up-lock for the landing gear comprising a pivoted supporting lever, a latch carried by said supporting lever to normally be cooperative with a part of the retracted landing gear to prevent the protraction of the gear, a pivoted controlling lever, a toggle connection between said levers whereby the supporting lever is locked against movement when the controlling lever assumes a first position, and operating means for the controlling lever to move it to a second position thereby moving the supporting lever and the latch carried by it to a position allowing protraction of the landing gear.

11. In an aircraft the combination with a fuselage including a retractable landing gear, of a fixed pivot on said fuselage, a supporting bell crank lever mounted on said fixed pivot, a latch pivoted to said supporting bell crank lever, a spring interposed between the free end of said latch and said lever, a controlling bell crank lever pivotally mounted adjacent a portion of the fuselage and limited in its movement in one direction by such portions of the fuselage, a link interposed between and pivoted to both bell crank levers to lock them against movement upon the limiting of the movement of the controlling lever in one direction, thereby holding the latch in a position to cooperate with the landing gear upon its retraction, and a control extending from the cockpit to said controlling bell crank levers to move it from its normal position thereby freeing the supporting bell crank lever for movement to move the latch from its operative position.

12. In an aircraft the combination with a fuselage, of a tail wheel structure, means for protracting and retracting said tail wheel, a lock assembly mounted in the fuselage for movement as a unit to and from a position for the engagement and support of the retracted wheel structure, and means interposed between the fuselage and the lock assembly operable to fix the latter in, or move it from, its position to engage and support said tail wheel structure.

EDWARD W. × SHAW.
his mark

Witnesses to mark:
JOHN A. McGIRR,
C. D. SHAW.